United States Patent
Kilgour (10) Patent No.: US 9,462,519 B2
(45) Date of Patent: Oct. 4, 2016

(54) NETWORK ELEMENTS, CELLULAR COMMUNICATION SYSTEM AND METHODS THEREFOR

(71) Applicant: ip.access Limited, Cambridgeshire (GB)

(72) Inventor: Christopher Edward John Kilgour, Cambridgeshire (GB)

(73) Assignee: IP.Access Limited, Cambridgeshire (GB)

(*) Notice: Subject to any disclaimer, the term of this patent is extended or adjusted under 35 U.S.C. 154(b) by 0 days.

(21) Appl. No.: 14/426,024

(22) PCT Filed: Aug. 27, 2013

(86) PCT No.: PCT/EP2013/067697
§ 371 (c)(1),
(2) Date: Mar. 4, 2015

(87) PCT Pub. No.: WO2014/040851
PCT Pub. Date: Mar. 20, 2014

(65) Prior Publication Data
US 2015/0296429 A1 Oct. 15, 2015

(30) Foreign Application Priority Data
Sep. 12, 2012 (GB) .................................. 1216256.6

(51) Int. Cl.
*H04W 4/00* (2009.01)
*H04W 36/00* (2009.01)
(Continued)

(52) U.S. Cl.
CPC ......... *H04W 36/0083* (2013.01); *H04W 16/32* (2013.01); *H04W 36/30* (2013.01); *H04W 88/12* (2013.01)

(58) Field of Classification Search
CPC ........... H04W 16/32; H04W 36/0083; H04W 36/30; H04W 88/12; H04W 36/00; H04W 36/0005; H04W 36/0055
USPC ............ 455/436, 437, 438, 439, 440, 432.1, 455/434, 435.2
See application file for complete search history.

(56) References Cited

U.S. PATENT DOCUMENTS 7,477,920 B2 * 1/2009 Scheinert .............. H04W 24/02
455/423
2007/0097938 A1 * 5/2007 Nylander .......... H04L 29/12066
370/338

(Continued)

FOREIGN PATENT DOCUMENTS

EP 2244503 A1 10/2010
EP 2268079 A1 12/2010

(Continued)

OTHER PUBLICATIONS

British Patent Application No. GB1216256.6; Search Report Under Section 17 Dated Dec. 17, 2012.

(Continued)

*Primary Examiner* — Jean Gelin
(74) *Attorney, Agent, or Firm* — Fitch Even Tabin & Flannery LLP (57) ABSTRACT

A method and apparatus is provided for facilitating identification of a cell in a cellular communication system and particularly a system which incorporates different radio access technologies. A network element such as a Radio Network Controller (RNC) includes a store containing a neighbor cell list, the neighbor cell list containing parameters relating to neighbor cells wherein parameters of cells in the neighbor cell list which have a common area of coverage and which support radio access technologies different from one another are linked together. A signal processor correlates measurement reports received by the RNC from a user equipment with the neighbor cell list to determine the identity of a cell in the cellular communication system. The invention has particular applicability to resolving the problem of Primary Scrambling Code confusion where a repeating pattern of small cells lies underneath a macrocell.

10 Claims, 4 Drawing Sheets

(51) Int. Cl.
*H04W 16/32* (2009.01)
*H04W 36/30* (2009.01)
*H04W 88/12* (2009.01)

(56) References Cited

U.S. PATENT DOCUMENTS

| | | | | |
|---|---|---|---|---|
| 2008/0188215 | A1* | 8/2008 | Bergstrom | H04W 48/20 455/424 |
| 2009/0047956 | A1* | 2/2009 | Moe | H04J 11/0093 455/436 |
| 2009/0047958 | A1* | 2/2009 | Rimhagen | H04J 11/0093 455/436 |
| 2010/0278161 | A1* | 11/2010 | Ore | H04W 36/0083 370/338 |
| 2011/0201332 | A1* | 8/2011 | Siomina | H04W 64/00 455/434 |
| 2012/0071085 | A1* | 3/2012 | Gunnarsson | H04W 24/00 455/7 |
| 2012/0135771 | A1* | 5/2012 | Futaki | H04B 7/024 455/509 |
| 2012/0225657 | A1* | 9/2012 | Watanabe | H04W 36/0055 455/436 |
| 2013/0079007 | A1* | 3/2013 | Nagaraja | H04W 36/0005 455/436 |

FOREIGN PATENT DOCUMENTS

| | | |
|---|---|---|
| GB | 2472594 A | 2/2011 |
| GB | 2484414 A | 4/2012 |

OTHER PUBLICATIONS

British Patent Application No. GB1216256.6; Examination Report Under Section 18(3) Dated Sep. 29, 2014.
PCT Patent Application No. PCT/EP2013/067697; International Search Report and The Written Opinion Dated Nov. 18, 2013.
European Application No. 13 753 623.1-1857; Communication Pursuant to Article 94(3) EPC Dated Feb. 2, 2016.

* cited by examiner

NETWORK ELEMENTS, CELLULAR COMMUNICATION SYSTEM AND METHODS THEREFOR

CROSS REFERENCE TO RELATED APPLICATIONS

This application is a national phase application of International Application No. PCT/EP2013/067697, filed Aug. 27, 2013333333, claiming priority to Great Britain Application No. 1216256,6, filed Sep. 12, 2012, which has issued as Great Britain Patent No. 2505885, Published Mar. 19, 2014, both of which are incorporated by reference herein in their entirety.

FIELD OF THE INVENTION

The field of this invention relates to network elements, a cellular communication system and methods for identifying a cell in a cellular communication system. The invention is particularly applicable to cellular communication systems which comprise more than one type of radio access technology (RAT).

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org). The $3^{rd}$ generation of wireless communications has generally been developed to support macro-cell mobile phone communications. Such macro cells utilise high power base stations (NodeBs in 3GPP parlance) to communicate with wireless communication units within a relatively large geographical coverage area. Typically, wireless communication units, or User Equipment (UEs) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in a form of a Radio Network Controller (RNC), operably coupled to the one or more Node Bs, via a so-called Iub interface.

The second generation wireless communication system (2G), also known as GSM, is a well-established cellular, wireless communications technology whereby "base transceiver stations" (equivalent to the Node B's of the 3G system) and "mobile units" (user equipment) can transmit and receive voice and packet data. Several base transceiver stations are controlled by a Base Station Controller (BSC), equivalent to the RNC of 3G systems.

Communications systems and networks are developing towards a broadband and mobile system. The 3rd Generation Partnership Project has proposed a Long Term Evolution (LTE) solution, namely, an Evolved Universal Mobile Telecommunication System Territorial Radio Access Network, (E-UTRAN), for a mobile access network, and a System Architecture Evolution (SAE) solution, namely, an Evolved Packet Core (EPC), for a mobile core network. An evolved packet system (EPS) network provides only packet switching (PS) domain data access so a voice service is provided by either a packetised voice mechanism such as Voice over IP or a 2G or 3G Radio Access Network (RAN) and circuit switched (CS) domain network. User Equipment (UE) can access a CS domain core network through a 2G/3G RAN such as the GSM EDGE Radio Access Network (Enhanced Data Rate for GSM Evolution, EDGE) Radio Access Network or a Universal Mobile Telecommunication System Terrestrial Radio Access Network (Universal Mobile Telecommunication System Terrestrial Radio Access Network, UTRAN), and access the EPC through the E-UTRAN.

Some user equipments have the capability to communicate with networks of differing radio access technologies. For example, a user equipment may be capable of operating within a UTRAN and within an E-UTRAN.

Lower power (and therefore smaller coverage area) cells are a recent development within the field of wireless cellular communication systems. Such small cells are effectively communication coverage areas supported by low power base stations. The terms "picocell" and "femtocell" are often used to mean a cell with a small coverage area, with the term femtocell being more commonly used with reference to residential small cells. Herein, the term "small cell" means any cell having a small coverage area and includes "picocells" and femtocells. The low power base stations which support small cells are referred to as Access points (AP's) with the term Home Node B (HNB's) or Home Evolved Node B (HeNB) identifying femtocell access points. Each small-cell has one Access point. These small cells are intended to augment the wide area macro network and support communications to User Equipments in a restricted, for example, indoor environment. An additional benefit of small cells is that they can offload traffic from the macro network, thereby freeing up valuable macro network resources.

Typical applications for such Access Points include, by way of example, residential and commercial locations, communication 'hotspots', etc., whereby Access Points can be connected to a core network via, for example, the Internet using a broadband connection or the like. In this manner, femto cells can be provided in a simple, scalable deployment in specific in-building locations where, for example, network congestion at the macro-cell level may be problematic.

An example of a typical HNB for use within a 3GPP system may comprise Node-B functionality and some aspects of Radio Network Controller (RNC) functionality.

A HNB is an access point that provides a wireless interface for a user equipment connectivity. It provides a radio access network connectivity to a user equipment (UE) using the so-called Iuh interface to a network Access Controller, also known as a Home Node B Gateway (HNB-GW). One Access Controller (AC) can provide network connectivity of several HNB's to a core network.

In a small cell network it is known that there may be a very large number of small cells compared to the number of macro cells, with small cells often residing within or overlapping macro cells in the same geographic area.

Thus, the coverage area of a single macro cell will inevitably overlap (and encompass) a coverage area of a large number of small cells.

In a planned macro cell network, a so-called neighbour cell list is used to identify adjacent cells to each macro cell, to facilitate handover of UE communications from a "source" cell to a "target" cell. The neighbour cell list is broadcast to roaming UEs to enable the roaming UE to receive and assess the suitability of continuing a communication by transferring the communication to an adjacent (neighbour) cell. The neighbour cell list of the macro cell contains frequency and scrambling code information for all of the cells whose coverage area overlaps with the macro cell, to allow the UE to be able to receive and decode transmissions from the neighbouring cells.

In a macro cell network, the neighbour cell list is configured in the radio network controller (RNC) or BSC in the case of a GSM (2G) network. The RNC (or BSC) stores a neighbour cell list for each of the Node-Bs (or BTS's) that the RNC (or BSC) controls. The macro cell neighbour cell list is normally configured based on information provided by a cell-planning database. The cell-planning database can be informed of the geographic location of a Node-B (or BTS) and is able to return a list of other Node-B's (or BTS's) whose coverage areas are close to or overlap the identified Node-B (or BTS). A neighbour cell list for a Node-B (as configured at the RNC) is essentially a list of structures; with each structure containing a frequency and scrambling code to be used by the UE to access signals from every neighbour cell.

If it is assumed that a user equipment (UE) is participating in an active call, the UE receives measurement control messages to measure from the neighbour cell list in a radio resource control (RRC) system information message from the RNC via a node B. The UE measures the specified frequency and scrambling code to identify the best (generally closest) neighbouring macro cells to consider as potential target cells.

The system messages also instruct the UE as to what criteria should be used to trigger the sending of a measurement report (e.g. measuring a signal level and/or signal quality from a neighbouring cell that exceeds a predetermined threshold), and what information should be included in a measurement report.

The UE then monitors the specified neighbour cells, identified in a RRC measurement control message, until one of them meets the specified criteria. Once one of the neighbour cells meets the specified criteria, the UE sends a Measurement Report to the RNC.

Given the large number of small cells compared to the number of macro cells, it is not possible to ensure that all the small cells within the coverage area of a macro cell have individual and different frequencies and scrambling codes.

In a combined small cell-macro cell environment, the macro cell RNC may be unable to determine, from the measurement report received from the UE, which cell was measured. Notably, this problem does not occur in a standard planned (macro cell) network, as the system planners are able to ensure that the coverage area of each cell only overlaps with a small number of other cells.

However, there still remains a limitation in the size of GSM, UTRAN and LTE neighbour cell lists that makes it difficult to identify a target cell for handover in the case of a dense deployment of cells because of the re-use of identifying parameters such as PSC (Primary Scrambling Code) in the case of WCDMA (wide band code division multiple access).

Currently in 3G CELL_DCH mode (where a UE sends measurement reports to a Node B,) it is only possible to use the UARFCN (UTRA absolute radio frequency channel number) and PSC as identifiers of a potential open-access 3G target for measurement as well as quality levels to be measured, and to specify a maximum of 32 cells for measurement in each of intra-frequency, interfrequency, and inter-RAT classes. Open access cells permit any UE to access an Access Point (or HNB) or Node B, for example, and to receive the offered services. In contrast, closed access cells only allow access to a subscribed user.

In the case of a closed access (Closed Subscriber Group) cell and Release 9+ UEs solutions to the problem have been investigated based on broadcasting the PSC split for closed Access Points or HNBs and allowing the proximity indicator and autonomous search (see 3GPP TS 25.367) and reading of the cell Id.

Such mechanisms are not available in the case of 3G open cells (or for legacy UEs). The limitations described above mean that although standard means may be used to ensure that neighbouring small cells underneath a macro cell do not share the same PSC (in the case of UTRAN), a dense deployment means that the same PSC may be used by more than one cell neighbouring/underneath a macro cell, making the identification of the target cell difficult. For example, say that the number of PSC's for co-channel small cell neighbours is 32. Once 32 cells are exceeded, then at least one of the PSC's has to be re-used. So, if more than 32 small cells are underneath a macro cell, a source cell's RNC will have difficulty identifying a target small-cell uniquely. This is known as PSC Confusion.

Thus, there exists a need for an improved method and apparatus for identifying target (open) cells for handover in a cellular communication system that combines macro-cell and small cells.

SUMMARY OF THE INVENTION

Aspects of the invention provide network elements, a cellular communication system and methods therefor as described in the appended claims.

According to a first aspect of invention there is provided a method for identifying a cell in a cellular communication system, the method including the steps of;

configuring a neighbour cell list containing parameters relating to neighbouring cells, wherein parameters of those neighbouring cells which have a common area of coverage are linked together, receiving measurement reports of transmissions from cells included in the neighbour cell list, and correlating the measurement reports with the neighbour cell list to determine the identity of a measured cell.

The cellular communication system may incorporate one or more different radio access technologies.

In one example, the parameters which are linked together comprise parameters representing codes. In another example, the parameters which are linked together represent a code and a frequency. For example a primary scrambling code (used in a 3G RAT for example) may be linked with a training sequence code (used in a 2G RAT, for example). Alternatively, a primary scrambling code may be linked with a channel number (a UARFCN or ARFCN, for example).

The combination of measurement information from multiple RAT technologies and frequencies can be used to help "disambiguate" a target cell for handover.

The invention is particularly useful in cases where many small 3G cells lie underneath a 2G (GSM) macrocell or a picocell.

According to a second aspect of the invention, there is provided an apparatus comprising a network element for facilitating identification of a cell in a cellular communication system, the network element including a store containing a neighbour cell list, the neighbour cell list containing parameters relating to neighbouring cells wherein parameters of cells in the neighbour cell list which have a common area of coverage are linked together, and a signal processor for correlating measurement reports received by the network element from a wireless communication unit with the neighbour cell list to determine the identity of a cell in the cellular communication system.

According to a third aspect of the invention, there is provided an apparatus comprising a signal processor for facilitating identification of a cell in a cellular communication system, the signal processor being arranged to access a store containing a neighbour cell list, the neighbour cell list containing parameters relating to neighbour cells wherein parameters of cells in the neighbour cell list which have a common area of coverage are linked together, the signal processor being arranged to receive measurement reports from a wireless communication unit within the cellular communication system, the signal processor being arranged to correlate the received measurement reports with the neighbour cell list to determine the identity of a cell in the cellular communication system.

According to a fourth aspect of the invention, there is provided a tangible computer program product having executable program code stored thereon for executing a process to perform a method for identifying a cell in a cellular communication system in accordance with the first aspect.

The tangible computer program product may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

These and other aspects, features and advantages of the invention will be apparent from, and elucidated with reference to, the embodiments described hereinafter.

In accordance with one embodiment of the invention, the source cell (or a controlling and routing element such as an RNC) is pre-configured with a linking (or pairing) of RATs (or frequencies) used in a neighbouring cell supporting more than one RAT (e.g. GSM and 3G) or frequency and also with the identifying parameters used to control UE measurement (UARFCN, PSC) in the case of UTRAN and (ARFCN (absolute radio frequency channel number), BSIC (base station identity code) in the case of GSM).

In one optional embodiment of the invention, the process of configuring a neighbour cell list with the linking (or pairing) of parameters may be automated if the cell is provided with a network listen (NWL) function.

In a further optional embodiment of the invention, the process of configuring a neighbour cell list with the linking (or pairing) of parameters may utilise an automatic neighbour relation (ANR) process in order to read the Cell Ids plus RNC Ids of the neighbour.

Radio Access Network Information Management (RIM) may optionally be used for the routing of the neighbour cell list comprising the linked parameters.

In one optional embodiment of the invention, the source cell/source Radio Network Subsystem or a proxy entity (e.g. an intra-layer 'neighbour resolver') is, or becomes, configured with the linked pairings and a suitable UE in CELL_DCH mode may be instructed, typically by an Radio Resource Control (RRC) Measurement Control message, to monitor the frequencies/PSCs or other RAT identification to report on physical parameters (such as received signal strength indicators as defined in 3GPP 25.331) with values exceeding a certain threshold, and also a separate higher threshold for the purpose of handover.

A signal processor (or "neighbour resolver") which performs a neighbour resolution function may be incorporated in a RNC of a 3G network, an RNS (Radio Network Subsystem) associated with an RNC of a 3G network, a Base Station Controller in a 2G network or an Access Controller/Home Node B of a small cell network, or any other network subsystem.

Such a neighbour resolver may be accessible either by the source RNC (or HNB) or the target RNC (or HNB or HNB-GW).

Locating the neighbour resolver in the Radio Network Subsystem permits implementation of the invention within current 3GPP specifications.

Optionally, the method for identifying a cell may include, at the source RNC or HNB, modifying the "Source-to-Target Transparent Container," by the inclusion of additional measurement results. This facilitates aiding target resolution at the target side. As an example, at the source RNC or Access Point, this could be a modification of the Additional Measured Results field of a Single Measurement Report. Hence in one embodiment, the measurement reports may be added to a handover request message between a source cell network element and a target cell network element.

The invention may be deployed by using GSM Base Transceiver Stations merely as beacons which are set to indicate that they are barred or out of service.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

The inventive concept finds particular applicability in a cellular communication system that supports a number of overlapping communication coverage areas, for example a communication system that comprises a combination of small cells and macro cells. Further, the inventive concept finds applicability in a cellular communication system comprising more than one Radio Access Technology.

Those skilled in the art will recognize and appreciate that the specifics of the specific examples described are merely illustrative of some embodiments and that the teachings set forth herein are applicable in a variety of alternative settings. For example, since the inventive concepts do not depend on any particular combination of radio access technologies, it is envisaged that the inventive concepts can be applied to other combinations of RAT's although a combination of 2G systems and 3G systems are shown in the embodiments. As such, other alternative implementations within cellular communication systems conforming to different standards are contemplated and are within the scope of the various teachings described.

Figure 1:
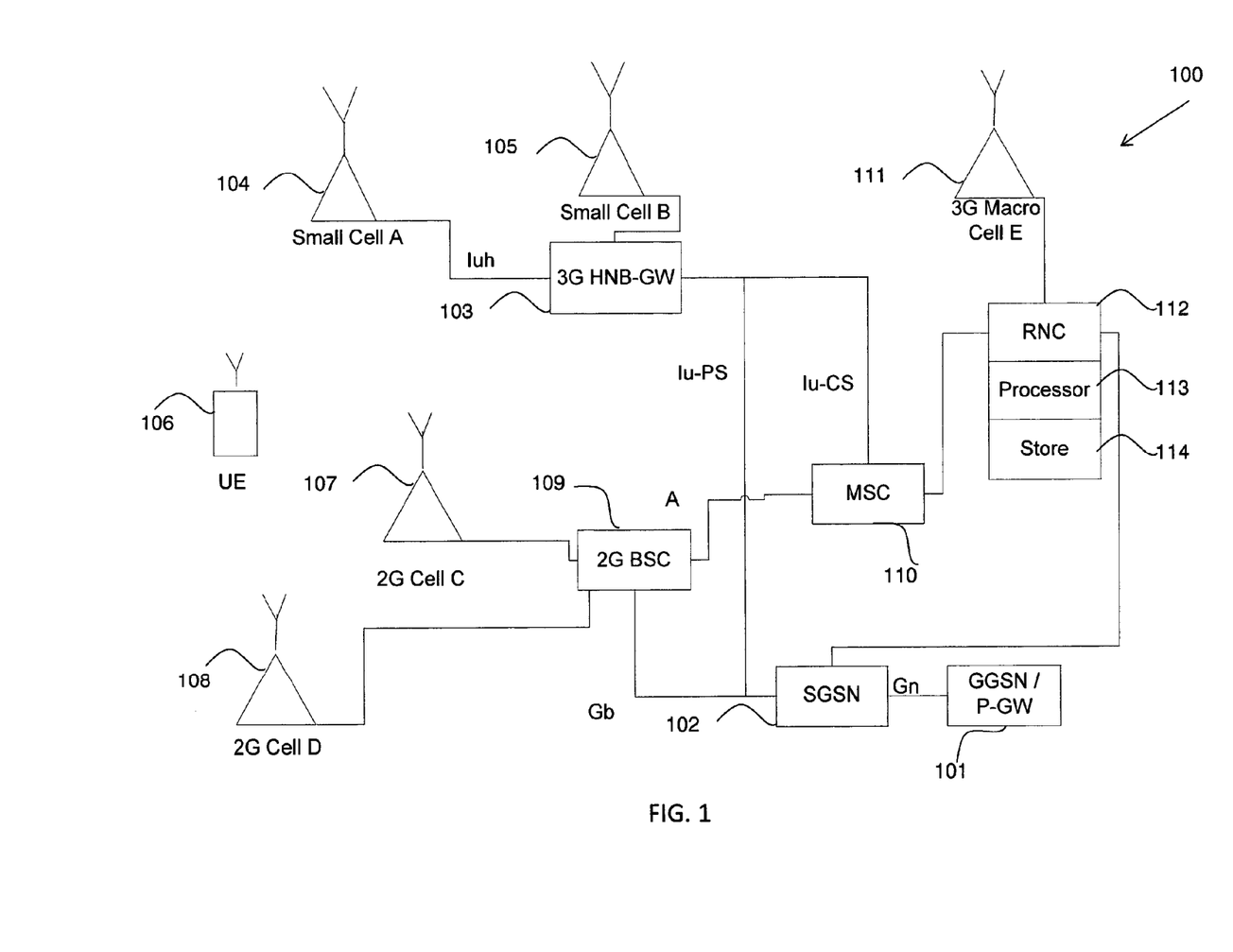
FIG. 1 illustrates a part of a cellular communication system comprising multi-radio access technologies and operating in accordance with an example embodiment.

Referring now to FIG. 1, an example of a multi-RAT wireless communication system operating in accordance with some embodiments of the invention is illustrated and indicated generally at 100. The system 100 comprises a plurality of small cells (only two of which, A and B are shown for the sake of clarity), two 2G (GSM) macro cells C and D and a 3G macrocell E.

A core network of the wireless communication system of FIG. 1 includes a Gateway General Packet Radio System (GPRS) Support Node (GGSN) 101 and a Serving GPRS Support Node (SGSN) 102. The GGSN101 or SGSN 102 is responsible for interfacing the wireless communication system 100 with a packet data network, for example a Public Switched Data Network (PSDN), (such as the Internet) or a Public Switched Telephone Network (PSTN). The SSGN 102 performs a routing and tunnelling function for traffic to and from the cells A, B, C, D and E while the GGSN 102 links with external packet networks. In an Evolved Packet Core, the equivalent node to a GSGN is a Packet Gateway (P-GW) and in this example, the two are shown combined.

Figure 2:
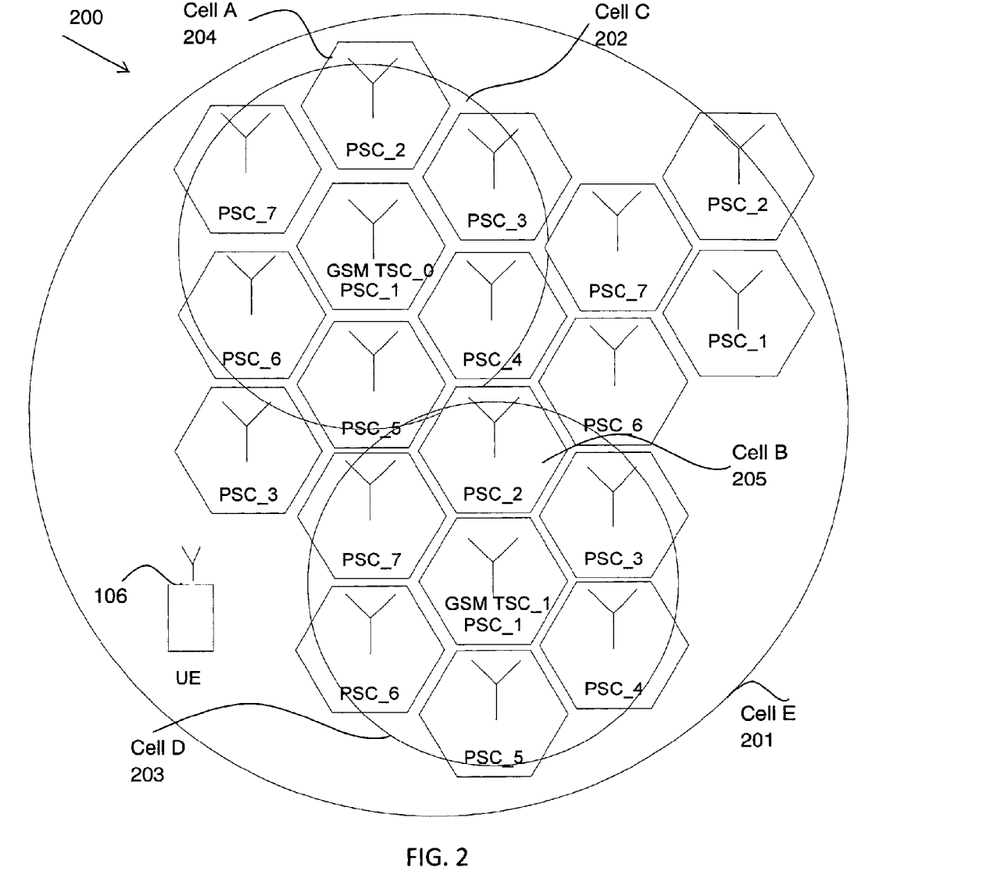
FIG. 2 illustrates an example of a multi-layer arrangement of cells comprising the cellular communication system of FIG. 1.

The small cell A and the small cell B are linked to the SGSN by way of Iu-PS and Iuh links via a 3G Home Node B Gateway 103. The small cell A is served by a network element in the form of an Access Point (AP)/Home Node B 104. Similarly, the small cell B is served by an associated network element in the form of an access point 105. As will be appreciated by the skilled artisan, an access point 104, 105 is a communication element that facilitates access to a communication network via a communication cell, such as a femto-cell. One application is that an AP may be purchased by a member of the public and installed in their home. The AP may then be connected to the HNB-GW 103 over the owners broadband Internet connection. Each AP 104, 105 is typically provided with transmitting and receiving means for communicating wirelessly with a user equipment.

Thus, an AP 104 is a scalable, multi-channel, two-way communication device that may be provided within, say, residential and commercial (e.g. office) locations, 'hotspots' etc, to extend or improve upon network coverage within those locations. Although there are no standard criteria for the functional components of an AP, an example of a typical AP for use within a 3GPP 3G system may comprise Node-B functionality and some aspects of Radio Network Controller (RNC) functionality as specified in 3GPP TS 25.467. The AP 104 communicates with User Equipments (UEs) such as UE 106 via a wireless interface. The small cells A and B are just two cells of a larger network of neighbouring small cells which will be described below with reference to FIG. 2. Each small cell is controlled by an associated access point similar to the access points 104 and 105 in FIG. 1. Only two access points are shown in FIG. 1 for the sake of clarity The 2G (GSM) macro-cell C is served by a Base Transceiver Station (BTS) 107 and the 2G (GSM) macrocell D is served by an associated Base Transceiver Station 108. Both BTS's are controlled by a Base Station Controller (BSC) 109. The BSC 109 is linked to the SGSN 102 and a Mobile Switching Centre 110. In the particular example of the embodiment of FIG. 1, the 2G cells A and B have coverage areas which are adjacent to one another. Further, they are assigned different BCC's (base station colour codes). They are also assigned ARCFN's (absolute radio frequency channel numbers) which may be the same or different. In a GSM network there are eight BCC's available. A BCC along with a network code may be arranged to make up a locally unique BSIC (base station identity code). This BSIC has a 1-1 correlation with the training sequence code (TSC) which is used by a cell for system broadcasts. Hence a TSC can also provide a unique local identifier for a 2G cell. The ARFCN (or broadcast frequency) may also serve as a local identifier for a 2G cell.

The 3G macrocell E is served by a node B 111 which is controlled by a radio network controller (RNC) 112. The RNC 112 incorporates a signal processor 113 and a store 114 whose functions will be described in greater detail below. The RNC 112 is linked to the SGSN 102 and to the mobile switching centre 110.

Referring now to FIG. 2 which is a schematic representation of a multi-RAT and multilayer arrangement cells comprising the cellular communication system of FIG. 1, the circle 201 represents the coverage area of the 3G macrocell E. The circles 202 and 203 which are adjacent to one another in this example represent the coverage areas of 2G macrocells C and D respectively. Both cells C and D lie within the coverage area 201 of 3G macrocell E. 2G macrocell C is assigned a TSC_0 and 2G macrocell D is assigned a TSC_1. Within the coverage areas of the macrocell is C, D and E is an underlayer of small cells whose coverage areas are represented as hexagons in FIG. 2. These small cells are arranged in a seven-cell re-use pattern. That is to say that an arrangement of seven small cells, each assigned with a unique primary scrambling code, PSC1-PSC 7 is configured within the coverage area 202 of cell C and the same arrangement is repeated in the same configuration within the coverage area of cell D. Although a classic 7-cell re-use pattern is illustrated in this example, the general principle applies to larger numbers, n, of PSCs. Assume that 7 PSCs have been allocated for a small cell layer which sits under a higher layer, and frequency limitations mean that the small cell deployment is co-channel. It is possible to arrange the 7 PSCs to avoid neighbour cells sharing the same PSC (PSC collision). However, once more than 7 (n) PSCs are utilised under the higher layer, then of necessity one of the PSCs must be repeated, leading to potential PSC confusion in identifying a cell under the higher layer by PSC alone.

In this particular example, small cell A, which is served by AP 104 and represented by a hexagon 204 is assigned a PSC 2 and lies within the coverage area of 2G macrocell C. Small cell B, which is served by AP 105 and is represented by a hexagon 295 is also assigned PSC 2 and lies within the coverage area of 2G macrocell D. Both small cells A and B (and their neighbours having a PSC of 1 or 3-70 all lie within the coverage area of macrocell E.

The UE 106 is capable of communicating wirelessly with the node B 111 of 3G macrocell E and any of the small cells, (A and B included). It is also capable of receiving transmissions from the 2G Base Transceiver Stations 107 and 108. Initially, in one example, the UE 106 is camped on to macrocell E and wishes to relocate to small cell A.

The RNC 112 (see FIG. 1) includes a store 114 for containing a modified neighbour cell list and a neighbour resolver processing module 113. This processing module 113 performs a neighbour resolution function which removes the ambiguity of cell identification encountered in known systems.

A neighbour cell list is conventionally configured and held in the RNC 112. Such a list typically contains parameters relating to cells which are close to, adjacent to or "underneath" the macrocell E which the RNC112 controls. In this example, the "neighbours" will be all the underlying small cells and the 2G cells C and D of FIG. 2. Neighbour cell parameters typically include frequencies and scrambling codes, In particular a list may include a cell identifier which may relate to its geographical location, the PSC of each small cell and the TSC of the 2G cells. So a neighbour cell list includes cells which support different radio access technologies or physically close or co-located cells supporting different radio access frequencies. A modified neighbour cell list is configured and held in the store 114. This modified neighbour cell list may be configured by the neighbour resolver processing module 113 or may be configured remotely and transmitted to the RNC for holding in the store 114. The modified neighbour cell list is configured by linking parameters of those neighbours in the neighbour cell list which have a common area of coverage. In the example of FIGS. 1 and 2, there will be a pairing of the parameters for 2G cell C and all the small cells (including cell A) which are covered by cell C. There will be a similar pairing of the parameters for 2G cell D and all the small cell (including cell B) which are covered by the 2G cell B. This modified neighbour cell list with the pairings of parameters is made available to the neighbour resolver processing module 133.

In this example, the PSC's of the small cells are paired with the TSC's of the 2G cells and included in the modified neighbour cell list In this example, the UE 106 is currently camped on to the node B 111 in cell E and in CELL-DCH mode. In CELL-DCH mode, the UE 106 is known on the cell level and can be requested to send measurement reports of signals received from neighbouring cells to the RNC 112 via a wireless link with the node B 111. Typical measurement reports on neighbouring cells can include signal levels and signal quality measurements which exceed certain thresholds. For example, the UE may detect the presence of a cell with a particular PSC but it does not actually know the cell's identity.

The node B 110 will know from the UE's "class mark" which radio access technologies (RAT) and frequency bands the UE 124 is capable of supporting and particularly, if it can support more than one RAT that may be employed in a neighbour cell. In this example, the UE 106 is instructed, by way of a conventional RRC (radio resource control) message to monitor signal levels of transmissions from cells having TSC 0, TSC 1 and PSC's 1-7. It will be clear from inspection of FIG. 2 that the combination of the strongest TSC with the strongest PSC in a particular location is unique.

The measurement reports received in the RNC 112 are accessed by the neighbour resolver processing module 113 and compared with the modified neighbour cell list in the store 114. From the pairings of neighbour cell parameters the neighbour resolver processing module 113 can resolve any ambiguity in the identity of a small cell which shares the same PSC as another i.e. PSC confusion is resolved. In particular, cell A can be distinguished from Cell B even though they have the same primary scrambling code. The UE 106 can also be requested to report signal values which exceed a certain relative or absolute thresholds and also a separate, higher threshold for the purposes of handover. Therefore, if the UE 106 requests a handover from the macrocell E (ie. the "source" cell) to a small cell (the "target" cell) having a PSC_2, the neighbour resolver processing module 113 is able to determine whether the small cell that the UE is reporting as having the higher signal strength is cell A or cell B by comparing the relative reported signal strengths of 2G cells having TS_0 and TSC_1.

In another example, the 2G macrocells C and D are assigned the same TSC, but are assigned different ARFCN's (ARFCN_0 and ARFCN_1) say. In this case, the PSC's of the small cells are paired with the ARFCN's of the 2G macrocells C and D and included in the modified neighbour cell list. The UE 105 is then instructed to monitor signal levels of transmissions from cells having ARFCN_0 and ARFCN_1 and PSC's 1-7. Then the combination of the strongest ARFCN with the strongest PSC in a particular location will be unique.

In a further example, the UE 106 may be initially camped on to small cell A (ie. the source cell) and require a relocation to another small cell or the macrocell E. In this case, the Home node B gateway 103 may be provided with a neighbour resolver processing module and store in a similar fashion to the RNC 112 in the above examples in order to correctly identify a target cell for handover.

In the above examples, the neighbour resolution function was carried out in the source cell, by the RNC 112 or 3G HNB-GW 109. The 3GPP RANAP (radio access network application part) (see 3GPP TS 25.413) and RNSAP (radio network subsystem application part) (see 3GPP TS 25.423) specifications, which are used for the purposes of inter-SRNS (serving radio network subsystem) handover, have the option for the measurement report that caused the SRNS to instigate a handover process, to be included in the relocation message towards the target RNS (see 3GPP TS 25.331 section 14.12.4.2 SRNS Relocation Info). This invention can exploit this option as it provides a means for an inter-layer neighbour resolution function, (as configured in accordance with the invention), to learn details for the handover.

Consequently as an alternative aspect of the invention, the neighbour resolution function may be carried out at a target Radio Network Subsystem (for example, a HNB or a RNC) or at a HNB-GW linked to the target RNS. This may be achieved by configuring the source small cells in such a way that their key radio-layer indexes used for measurement (e.g. frequency, primary scrambling code) indicate a particular RNC or HNB-GW without necessarily being sufficient to identify the target cell uniquely. This ensures that the Handover request can be routed towards the correct RNC or HNB-GW. Following this, the multi-RAT information can thus be conveyed to the target by either; (i) adding more Measurement Reports into the Handover Required/Handover Request messages between Source RNS and Target RNS. These Measurement Reports will contain inter-RAT Measurements, or (ii) Including the inter-RAT Measurements in the optional 'Additional Measured results' Information Element in the RRC Measurement Report (see 3GPP TS 25.331 section 10.2.19)

Note that mechanism (ii) above would not require changes to existing 3GPP messages. The target side RNC or HNB-GW may then access the Measurement Reports and possibly Additional Measured results to obtain inter-RAT measures in order to request the Neighbour Resolution function to correlate them and identify the target cell.

As a further element of this alternative aspect b), 3GPP TS 25.331 section 8.6.7.22 indicates that; (i) if any of the measurements referenced in the "Additional Measurement List" is an intra-frequency, interfrequency, or inter-RAT measurement, and this measurement is configured with event based reporting: (ii), the UE behaviour is not specified.

This means that although inter-RAT measurements may be normally included in the Measurement Report message from the UE at the same time as intra-frequency or interfrequency measurements, the inter-RAT measurements should be configured via periodic location reporting (the alternative to event based reporting). However, in current deployments, the use of event based reporting dominates because of its reduced signalling load. Consequently, an optional aspect of the invention is for the source RNC to be using event based measurement reporting and to modify the Measurement Report to include the event based Measurements into the Additional Measured results As a further optional aspect of the invention, the inter-RAT cells such as the 2G (GSM) cells C and D may be used solely as beacons without having to offer GSM service or deploy a GSM BSC. The cells' Base Transceiver Stations 107, 108 can be set to broadcast in a way that indicates that they are not accessible for normal service. This allows significant spectral efficiency gains because the GSM broadcast channel uses only a single timeslot (out of 8) and so other GSM beacons or active cells would be able to use the remaining time window in the same frequency for their own transmissions without risking interference.

In an alternative embodiment of the invention, instead of a HNB-GW or RNC being pre-configured with a conventional neighbour cell list from which a modified neighbour cell list is produced for use by a neighbour resolver processing module, the Access Point compiles the required information itself from cell broadcasts. In this alternative embodiment, an Access Point 104, 105 or Home Node B performs a network listen function by listening to the broadcast channel transmissions of neighbouring cells and extracting the necessary cell parameters from these transmissions. The Access point may be further provided with a neighbour resolver processing module which receives this information from a network listening device, compiles the extended neighbour cell list and correlates the relevant paired parameters with received measurement reports in order to uniquely identify a neighbouring cell.

In a further, alternative embodiment of the invention, configuration of a modified neighbour cell list may be augmented by the use of the (known) automatic neighbour relation (ANR). The ANR process is one which relies on a UE to report cells that it has detected but which are not on any neighbour cell list that it has been provided with by its serving access point. So in this embodiment, an Access Point or node B instructs a UE and any other UE in its area of coverage, to perform an ANR process. Each UE is then able to report neighbour cell parameters gained from monitoring the broadcast channels of neighbouring cells.

Figure 3:
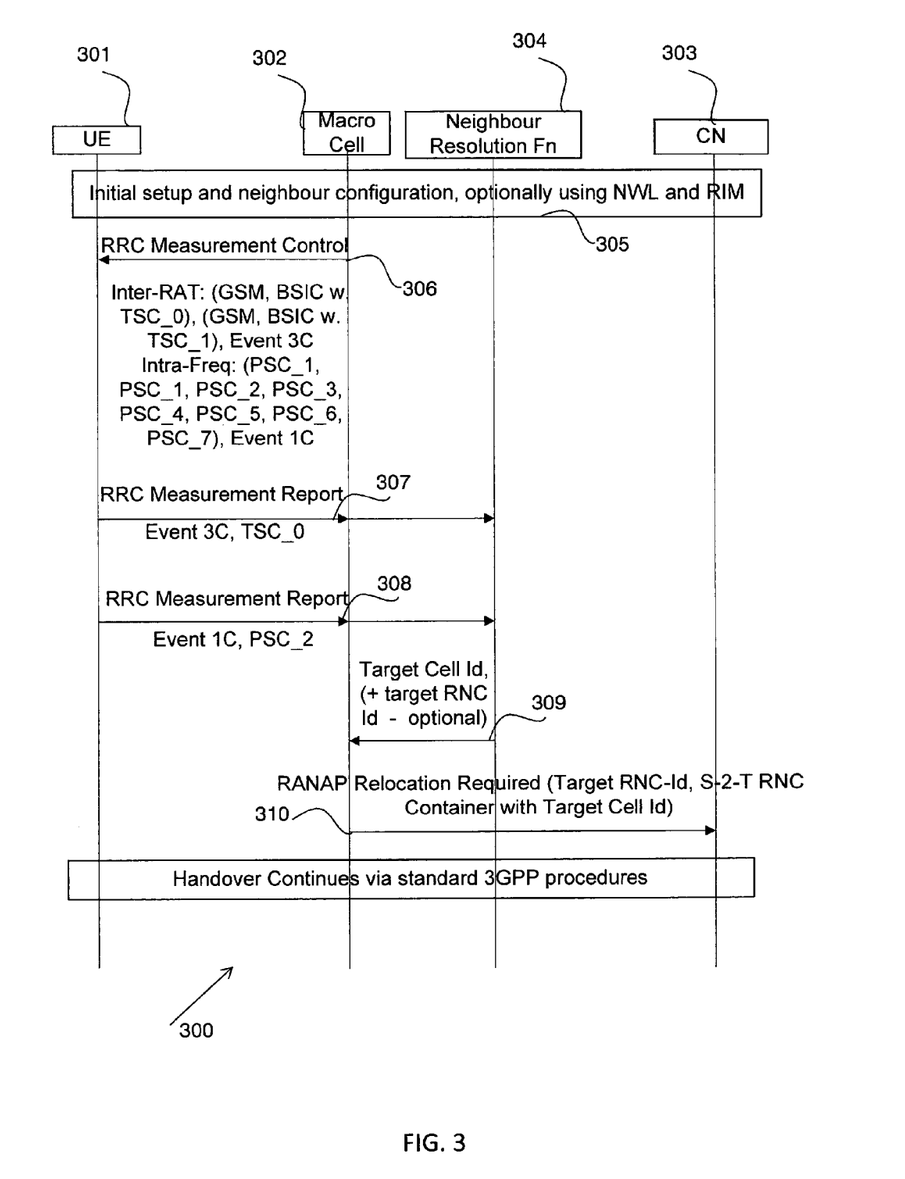
FIG. 3 is a message sequence chart of an example of a method for identifying a target cell in multi-RAT cellular communication system.

Referring now to FIG. 3 which is a message sequence chart of an example of a method for identifying a target cell in multi-RAT cellular communication system, a UE 301 is initially camped on to a small cell which is served by a Home Node B 302 which provides the UE with access to a core network (CN) 303. A neighbour resolution function 304 is accessible to the HNB 302 and in this example is incorporated in the (source) HNB 302. At 305, a modified neighbour cell list with pairings of parameters of those cells which have a common area of coverage and which support different radio access technologies is compiled and made accessible to the neighbour resolution function 304. Network Listen and RIM techniques (Radio Access Network Information Management) may optionally be used to assist in compiling the list and routing it to an appropriate network element.

At 306, one or more RRC measurement control messages are sent from the HNB 302 to the UE 301. This instructs the UE 301 to measure neighbour cell parameters which include PSC's of small cells and TSC's of 2G cells and to report those having strongest values or exceeding certain thresholds.

At 307, the UE 301 reports to the neighbour resolution function 304 via the HNB 302 (Event 3C) that the signal strength measured for TSC_0 exceeds the configured threshold.

At 308, the UE 301 reports to the neighbour resolution function 304 via the HNB 302 (Event 1C) that the strongest PSC measured is PSC_2. The neighbour resolution function is then able to correlate these received measurement reports with parameters in the modified neighbour cell list to determine that the small cell which is providing the strongest signal to the UE 301 and therefore the best candidate for handover is cell A (of FIG. 2), which lies within the coverage area of the GSM cell having TSC_0. (Cell A of FIG. 2).

At 309, the neighbour resolution function conveys the result of its correlation to the HNB 302 whereupon the HNB 302 sends (at 310) a conventional Relocation Request message to the Core Network 303. Thereafter, the handover process can proceed in a conventional manner.

Figure 4:
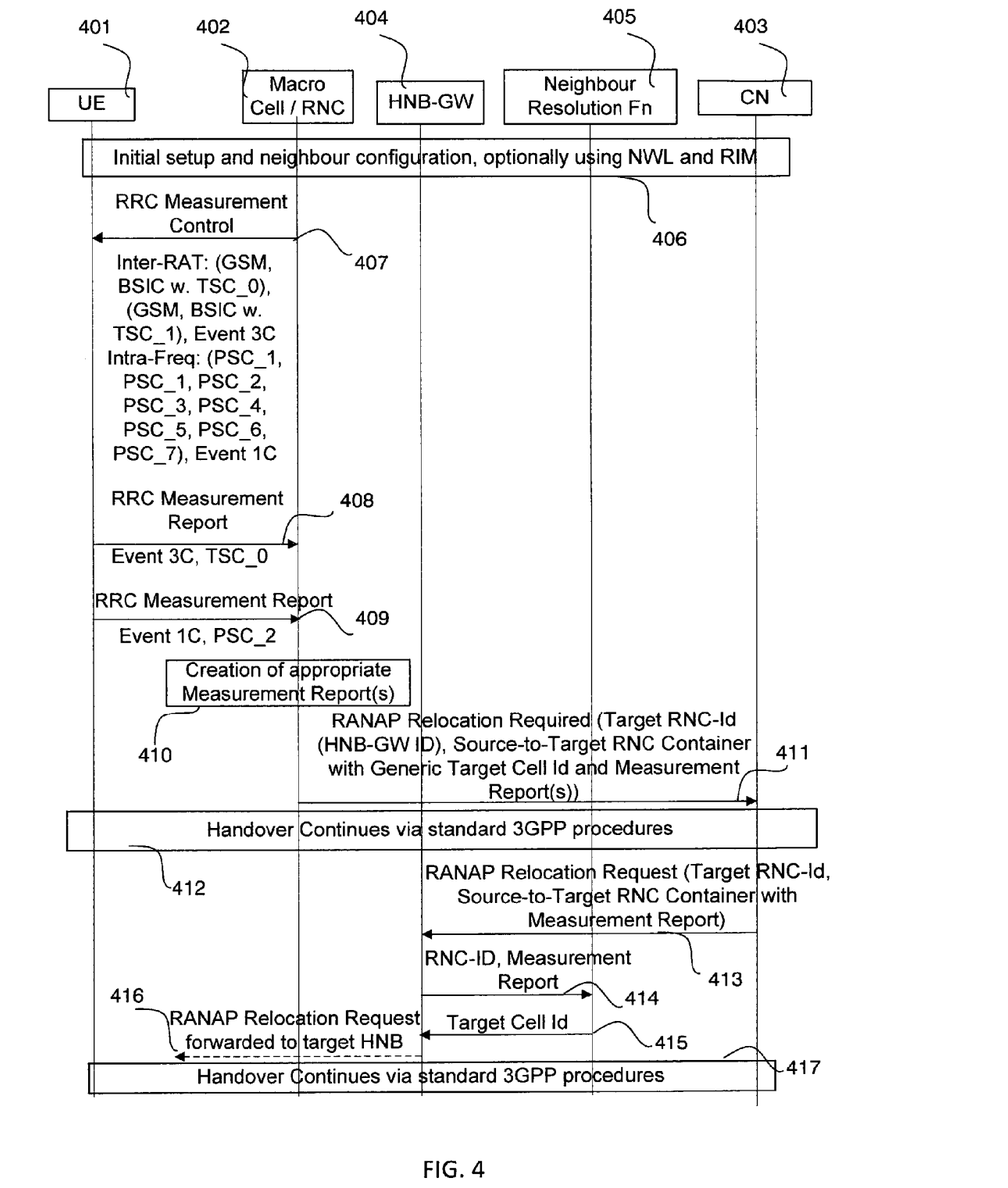
FIG. 4 is message sequence chart of an alternative example of a method for identifying a target cell in multi-RAT cellular communication system.

Referring now to FIG. 4 which is a message sequence chart of an alternative example of a method for identifying a target cell in multi-RAT cellular communication system, a UE 401 is initially camped on to on to a 3G macrocell which is served by an RNC 402 which provides the UE with access to a core network (CN) 403. A HNB-GW 404 controls a multiplicity of small cells to one of which, the UE 401 may wish to hand over. A neighbour resolution function 405 is accessible to the HNB-GW 404 and in this example is incorporated in the (target) HNB-GW 404.

At 406 a modified neighbour cell list with pairings of parameters of those cells which have a common area of coverage and which support different radio access technologies is compiled and made accessible to the neighbour resolution function 405. Network Listen and RIM techniques (Radio Access Network Information Management) may optionally be used to assist in compiling the list and routing it to an appropriate network element.

At 407, an RRC measurement control message is sent from the RNC 402 to the UE 401. This instructs the UE 401 to measure neighbour cell parameters which include PSC's of small cells and TSC's of 2G cells and to report those having strongest values or exceeding certain thresholds.

At 408, the UE 401 reports to the RNC 402 (Event 3C) that the measurement of TSC_0 exceeds the configured threshold.

At 409, the UE 401 reports to the RNC 402 (Event 1C) that the strongest PSC measured is PSC_2.

At 410 the appropriate Measurement Reports are created in the RNC 402 and at 411 transmitted to the Core Network 403 in a RANAP (Radio Access Network Application Part) Relocation Request Message. The process continues (412) in accordance with 3GPP handover procedure but at this point, the identity of the target cell is not known, only the HNB-GW 404 is identified in the message to the Core Network.

At 413, a RANAP relocation request Message is sent from the Core Network 403 to the HNB-GW 404.

In response at 414, the HNB-GW 404 sends the appropriate measurement reports to the Neighbour resolution function 405. The neighbour resolution function 405, which is incorporated in the (target) HNB-GW 404 in this example, is then able to correlate these received measurement reports with parameters in the modified neighbour cell list to identify which small cell is providing the strongest signal to the UE 401 and therefore the best candidate for handover.

At 415, the neighbour resolution function 405 sends the ID of this identified small cell to the HNB-GW 404.

At 416 the RANAP Relocation Request is forwarded from the HNB-GW 404 to the Access Point/Home Node B supporting the identified cell.

The handover process can then continue using standard 3GPP procedures (417).

The invention may be implemented by Operators of networks containing more than one radio access technology, or where different radio access technologies are co-located between networks, or where it is possible to use a second radio access technology as a beacon within existing spectrum allocation.

The signal processing functionality of the embodiments of the invention, particularly the neighbour resolution function of the neighbour resolver processing module 113, may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A method for identifying a cell in a cellular communication system, the method including the steps of:
   configuring a neighbor cell list containing parameters relating to neighboring cells, wherein parameters of those neighboring cells which have a common area of coverage are linked together;
   receiving from a wireless communication unit, measurements of a target cell identified as a candidate cell for handover from a source cell and having a specified cell parameter;
   identifying at least one neighboring cell, other than the source cell or target cell, in the neighbor cell list that has a common area of coverage with a cell having the specified cell parameter;
   transmitting an instruction to the wireless communication unit to send measurement reports of the identified at least one neighboring cell;
   receiving said measurement; and
   correlating the measurement reports with the neighbor cell list to determine the identity of the target cell.

2. The method of claim 1 wherein the parameters which are linked together comprise parameters representing codes.

3. The method of claim 1 wherein the parameters which are linked together represent a code and a frequency.

4. The method of claim 2 wherein the parameters which are linked together comprise a primary scrambling code and a training sequence code.

5. The method of claim 3 wherein the parameters which are linked together comprise a primary scrambling code and a channel number.

6. The method of claim 1 wherein the step of configuring the neighbor cell list includes a network listen process.

7. The method of claim 1 wherein the step of configuring the neighbor cell list includes an automatic neighbor relation process.

8. Apparatus for facilitating identification of a cell in a cellular communication system, the apparatus being arranged to:
   configure a neighbor cell list, the neighbor cell list containing parameters relating to neighbor cells wherein parameters of cells in the neighbor cell list which have a common area of coverage are linked together;
   receive from a wireless communication unit within the cellular communication system, measurements of a target cell identified as a candidate cell for handover from a source cell and having a specified cell parameter;
   identify at least one neighboring cell, other than the source cell or target cell, in the neighbor cell list that has a common area of coverage with a cell having the specified cell parameter;
   transmit an instruction to the wireless communication unit to send measurement reports of the at least one identified neighboring cell;
   receive said measurement reports from the wireless communication unit; and
   correlate the received measurement reports with the neighbor cell list to determine the identity of the target cell.

9. A non-transitory computer readable medium having computer readable instructions stored thereon for execution by a processor to perform the method of claim 1.

10. The non-transitory computer readable medium of claim 9 comprising at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

* * * * *

UNITED STATES PATENT AND TRADEMARK OFFICE
CERTIFICATE OF CORRECTION

| | | |
|---|---|---|
| PATENT NO. | : 9,462,519 B2 | Page 1 of 1 |
| APPLICATION NO. | : 14/426024 | |
| DATED | : October 4, 2016 | |
| INVENTOR(S) | : Christopher Edward John Kilgour | |

It is certified that error appears in the above-identified patent and that said Letters Patent is hereby corrected as shown below:

In the Specification

Column 1, Line 10; Delete "2013333333" and insert -- 2013 --, therefor; and

Column 1, Line 11; Delete "1216256,6" insert -- 1216256.6 --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*